E. E. WEST.
STEERING MECHANISM.
APPLICATION FILED FEB. 23, 1916.
1,265,563.
Patented May 7, 1918.
2 SHEETS—SHEET 1.
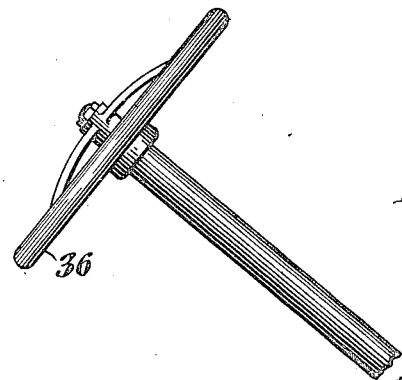
Fig. 1.
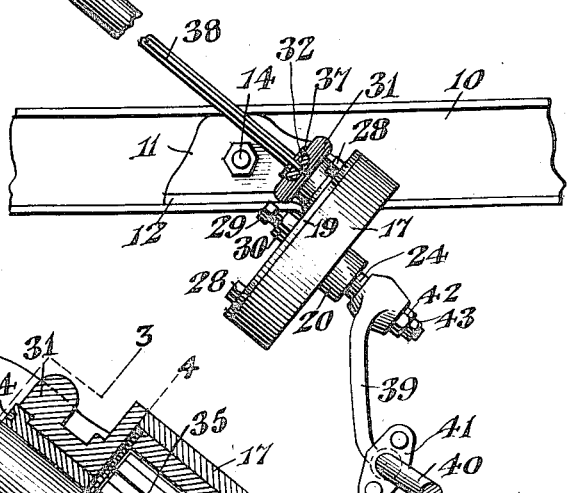
Fig. 2.
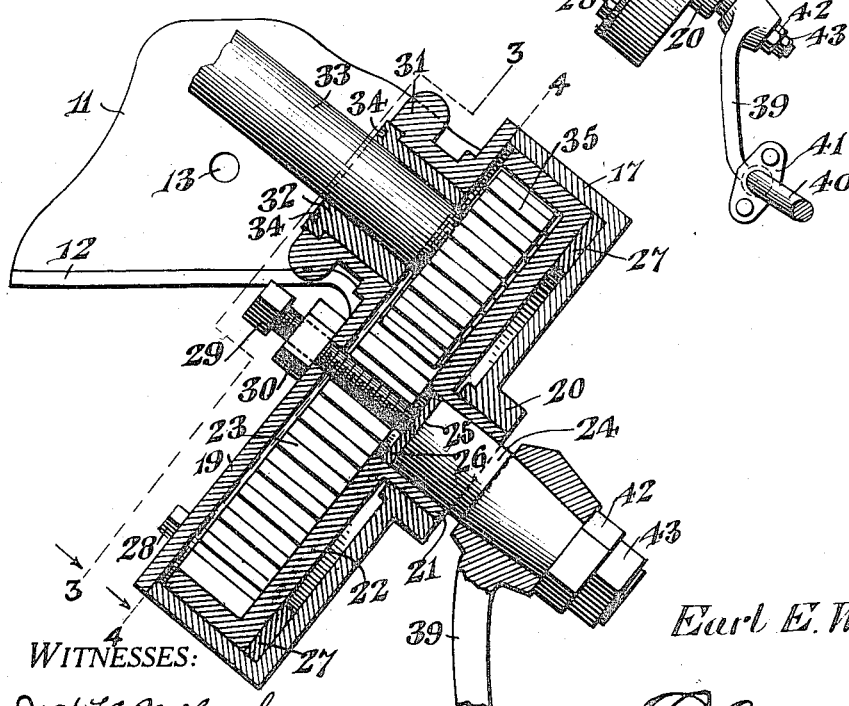
WITNESSES:
Jas. K. McCathran
T. T. Mowhinney
Earl E. West,
INVENTOR
BY
Attorney E. E. WEST.
STEERING MECHANISM.
APPLICATION FILED FEB. 23, 1916.
1,265,563.
Patented May 7, 1918.
2 SHEETS—SHEET 2.
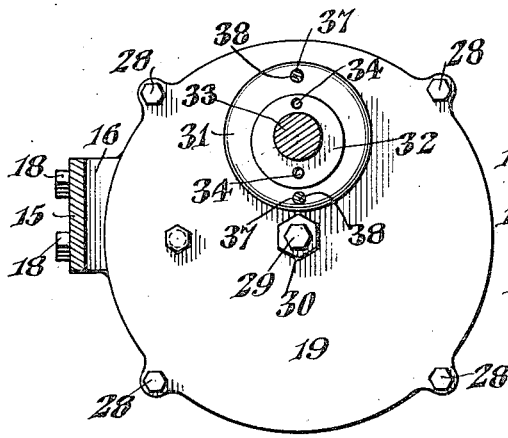
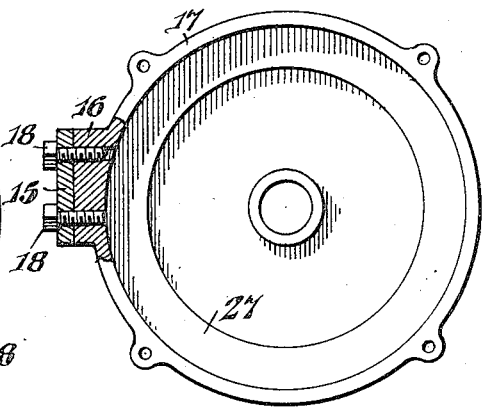
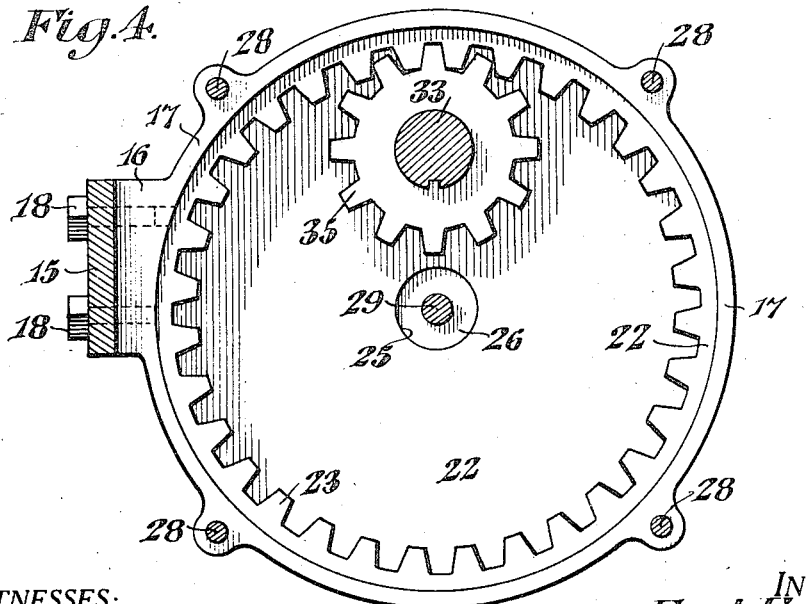
WITNESSES:
INVENTOR
Earl E. West,
BY
Attorney

UNITED STATES PATENT OFFICE.

EARL E. WEST, OF BRIDGEPORT, ILLINOIS, ASSIGNOR OF ONE-HALF TO EMERY A. LOCKE, OF BRIDGEPORT, ILLINOIS.

STEERING MECHANISM.

1,265,563.     Specification of Letters Patent.     Patented May 7, 1918.

Application filed February 23, 1916. Serial No. 79,945.

*To all whom it may concern:*

Be it known that I, EARL E. WEST, a citizen of the United States, residing at Bridgeport, in the county of Lawrence and State of Illinois, have invented a new and useful Steering Mechanism, of which the following is a specification.

The present invention relates to an improvement in steering mechanism, and has for an object to provide a one way resisting device for attachment to, or connection in, a steering mechanism to resist and retard any lateral turning movement of the steering wheels of the vehicle, so as to prevent the wabbling or easy deflecting of the same in sand, mud, and the like, and so as to admit of the easy adjustment of the steering arm and steering wheels by the turning of the steering post by the hand wheel.

Another object of the invention is to provide means for adjusting the resistance offered by this device, so that the device may be applied to vehicles of different weights, and steering mechanisms of different types, and also to various conditions met with in the installation and use of steering gear.

In carrying out the various objects and advantages of this invention, the steering arm is mounted upon a relatively short steering shaft, which is directly connected to a relatively large gear having a frictional contact face. A stationary frictional part is provided, which bears against the gear to resist and retard its rotative movement. The steering column or post is provided with a pinion which meshes with the gear, and is relatively small, so that a slight pressure only on the hand wheel is necessary to rotate the column and actuate the gear to adjust the steering arm. A tension screw is also provided which bears against the gear to force the latter with more or less tension against the friction surface to thus increase or decrease the resistance to turning of the steering arm.

Other objects and advantages will be brought out in the following detail description of the present preferred embodiment of the invention, which is illustrated in the accompanying drawing, wherein—

Figure 1 is a side elevation of a steering mechanism, embodying the features of this invention.

Fig. 2 is a detail enlarged vertical sectional view, taken through the casing, and parts of the improved mechanism mounted therein.

Fig. 3 is a transverse section, taken on the line 3—3 of Fig. 2, and looking in the direction of the arrow, showing in plan the top of the gear case or housing.

Fig. 4 is a horizontal sectional view, taken on the line 4—4 of Fig. 2, showing the internal gear in the casing, and the pinion meshing therewith.

Fig. 5 is a top edge view of the gear casing or housing with the gears removed, and showing the friction ring mounted in the bottom of the housing, the attaching means to secure the housing to a vehicle being shown in section.

Referring to these drawings, wherein like parts are designated by similar characters of reference throughout the several views, 10 designates the side bar of a vehicle frame, which may be of any approved construction, but which in the present instance, is shown of channel iron, and having the flanges thereof projecting inwardly. Secured to the side bar 10 of the vehicle frame is a bracket 11, the same comprising a plate fitting between the flanges of the channel bar, and having an inwardly extending flange 12 along its lower edge adapted to seat upon the lower flange of the side bar 10. The bracket plate 11 has an opening 13 therethrough for the reception of a clamping bolt 14, which is secured through the side bar and the bracket to hold the latter firmly in place. The forward lower corner of the bracket 11 has an inwardly extending and downturned lug 15, which is given the desired curvature to dispose the inner flat face thereof against an ear 16 projecting laterally from one side of a casing 17. Machine screws 18 pass inwardly through the lug 15, and into the ear 16 to hold the two together.

As may be best seen from Figs. 2 and 5, the casing 17 is of cylindrical form, and is relatively shallow. The casing is open at its top but is provided with a detachable cover plate 19 for closing the same. The bottom of the casing is provided with an opening therethrough, and a depending boss 20 about the opening forming a substantial bearing through which projects the hub portion 21 of a large gear wheel 22. The gear wheel 22 is of a diameter to snugly fit into the casing and turn therein. The gear wheel 22 has internal teeth 23 and is open at its upper or top side, so that upon the removal of the cover 19 access may be readily had to the interior of the gear wheel 22. The gear wheel 22 carries a steering shaft or arbor 24 in the form of a relatively short pin which is sweated, welded, or otherwise permanently and securely attached to the hub 21 of the gear wheel 22. The steering shaft 24 is sunk below the upper surface of the bottom of the gear 22 to provide a recess 25 into which is fitted a friction disk 26. In the bottom of the casing 17 is placed a friction ring 27. As may be best seen from Figs. 2 and 5, the ring is of substantial thickness and width and extends entirely around the casing and lies upon the bottom thereof, so as to receive thereagainst the lower flat relatively broad face of the gear 22. Thus, a substantial friction engaging face is provided for contact with the gear to resist and retard its turning.

The cover 19, which is secured to the casing 17 by machine screws 28 at spaced intervals about the edge of the casing, has a threaded opening therethrough at its central portion to receive a tension screw 29 extending centrally through the cover 19, and into the gear 22 for direct contact against the friction disk 26 to force the gear 22 downwardly in the casing against the friction ring 27 more or less, according to the turning of the tension screw 29, to vary the resistance of the gear 22 to turning. The lock nut 30 is carried upon the outer end of the tension screw 29, and is adapted to bind against the outer face of the cover to secure the tension screw from turning when submitted to vibration, or the like.

At one side, the cover 19 is provided with an upstanding boss 31, having a bearing 32 therein, which, as shown to advantage in Fig. 3, is preferably eccentrically mounted, whereby upon the turning of the bearing 32, the central opening therethrough, which is eccentrically formed through the bearing 32, may be adjusted toward or from the adjacent outer edge of the casing. The lower end of a steering post or column 33 is journaled in this bearing 32, and the latter has in its outer end diametrically extending recesses or openings 34 for the reception of the prongs or projections of a wrench to turn the bearing 32, and adjust the steering post 33 toward and from the edge of the casing 17. A relatively small pinion 35 is keyed, as shown in Fig. 4, to the lower end of the steering post 33, and is of such width as to lie within the gear wheel 22, without contact with the bottom thereof, as shown to advantage in Fig. 2. The pinion 35 meshes with the internal teeth 23 of the gear wheel and is adapted to rotate the same when the steering column 33 is turned. The usual hand wheel 36 is mounted upon the upper end of the steering column, in any suitable manner and is adapted to be turned to rotate the steering column. From Figs. 1 and 3, it will be noted that the boss 31 is provided in its upper face, outwardly of the bearing 34, with sockets or stepped bearings 37 to receive the lower ends of rods 38, which control the internal combustion engine, or other desired mechanism, and which is operable from the hand wheel.

The lower end of the steering shaft 24 is provided with the usual steering arm 39, which is connected to the connecting rod 40 by means of the ball and socket joint 41. In the usual manner, the connecting rod 40 is attached to the steering knuckles for controlling the angular movements of the front steering wheels of motor vehicles.

The steering arm 39 is of the usual form and the lower end of the steering shaft 24 is slightly tapered to receive the hub of the arm, the hub being held to the steering shaft by a nut 42, which is secured in place by a second or lock nut 43.

In the operation of the improved steering mechanism, the operator turns the hand wheel 36 in the usual manner, which rotates the post 33, and, by reason of the reduced gearing, turns the large gear wheel 22 by means of the small pinion 35. The turning of the gear wheel 22 rotates the steering shaft 24, and swings the steering arm 33 to adjust or regulate the steering wheels.

When the vehicle is driven through sand, mud, or the like, and lateral resistance is offered to the front steering wheel, the strain of such pressure is usually transmitted directly to the hand wheel, so that the operator must of necessity resist the action of the steering wheels. The present invention relieves the operator from this strain, and when lateral thrust is exerted against the steering wheels and creates a tendency for the steering arm 39 to turn, the friction ring 27 resists and retards the turning of the gear wheel 22, so that the front steering wheels may only be turned upon the exertion of abnormal lateral pressure against the front steering wheels. This resistance to the turning of the steering arm may be adjusted to the desired tension, by means of the screw 29. Access may be readily had to this screw, as the angular head thereof projects upwardly from the casing 17, and a wrench may be readily fitted to the screw upon lifting the hood of the motor vehicle in the usual manner of gaining access to the steering mechanism.

The bracket plate 11 so holds the casing 17 that the cover 19 thereof is at the upper side of the casing, so that the cover may be readily removed, and access be easily had to the interior of the casing, and as the large gear opens upwardly through the casing, the pinion and the lower end of the steering post may be readily reached. By turning the bearing on the cover 19, the steering post and its pinion may be adjusted laterally toward and from the teeth of the internal gear, so as to take up wear and properly adjust the engagement between the gear and the pinion. By the removal of the clamping nuts on the lower end of the steering shaft, the internal gear may be lifted upwardly out of the casing, so that all of the parts may be easily and quickly disassembled, and be as readily replaced in the casing.

It is, of course, understood that the above specifically outlined construction is capable of various modifications and changes, without departing from the spirit of this invention, and being restricted only by the scope of the following claims.

What is claimed is:—

1. The combination with a steering post, and a steering arm, of a casing open at one side, an internal gear fitting into said casing and opening outwardly therethrough, a friction ring mounted in the bottom of the casing for contact with the lower flat face of the gear wheel, a connection between said gear wheel and the steering arm, a cover for the casing to inclose the same and the gear wheel, a tension screw threaded through the cover for contact with the bottom of the gear wheel to force the same more or less against the friction ring, a bearing carried by the cover to receive the lower end of said steering post, a pinion mounted on the lower end of said steering post, and means for adjusting said bearing to advance and retard the pinion with respect to the teeth of said gear wheel.

2. The combination with a steering post, and a steering arm, of a casing for attachment to the frame of a vehicle, an internal gear fitting in the casing, a friction ring in the casing for engagement with the gear to retard and resist the turning thereof, a steering shaft carried by the gear and projecting outwardly through the casing to support said steering arm, a pinion mounted on said post and fitting in said internal gear to mesh therewith and turn the gear by the operation of the post, and a screw projecting into the casing and being adapted to be turned up into engagement with said gear for binding the latter to the desired extent against said friction ring.

In testimony that I claim the foregoing as my own, I have hereto affixed my signature in the presence of two witnesses.

EARL E. WEST.

Witnesses:
WALTER P. MOVIUS,
JAMES WEST.